United States Patent [19]

Nomura et al.

[11] Patent Number: 5,013,773

[45] Date of Patent: May 7, 1991

[54] THERMOPLASTIC RESIN COMPOSITION AND PROCESS FOR PRODUCING THE SAME

[75] Inventors: Manabu Nomura; Kaoru Wada, both of Ichihara, Japan

[73] Assignee: Idemitsu Petrochemical Company Limited, Tokyo, Japan

[21] Appl. No.: 280,794

[22] Filed: Dec. 7, 1988

[30] Foreign Application Priority Data

Dec. 8, 1987 [JP] Japan .................. 62-311192
Mar. 11, 1988 [JP] Japan .................. 63-58027

[51] Int. Cl.$^5$ .......................... C08K 7/08; C08K 3/30; C08L 23/10; C08L 23/04
[52] U.S. Cl. .................. 523/222; 524/423; 524/584; 524/586
[58] Field of Search .................. 523/222; 524/423

[56] References Cited

FOREIGN PATENT DOCUMENTS

| | | | |
|---|---|---|---|
| 57-109846 | 7/1982 | Japan . | |
| 58-142921 | 8/1983 | Japan | 524/423 |
| 59-17253 | 9/1984 | Japan . | |
| 61-72038 | 4/1986 | Japan | 524/423 |
| 61-130359 | 6/1986 | Japan | 524/423 |
| 62-91546 | 4/1987 | Japan | 524/423 |
| 63-142049 | 6/1988 | Japan | 524/423 |
| 63-218747 | 9/1988 | Japan | 524/423 |

*Primary Examiner*—C. Warren Ivy
*Attorney, Agent, or Firm*—Armstrong, Nikaido, Marmelstein, Kubovcik & Murray

[57] ABSTRACT

A thermoplastic resin composition which comprises 30 to 99 wt % of a thermoplastic resin and 1 to 70 wt % of granulated fiber formed by granulating inorganic fibers having an average fiber diameter of 0.1 to 1.0 μm, an aspect ratio of 50 to 300, and an oil absorption of 400 ml/100 g and above, said granulated fiber having an average diameter of 0.5 to 5 mm and a bulk density of 0.15 to 0.4.

A process for producing a thermoplastic resin composition which comprises mixing in a mixer 30 to 99 wt % of a thermoplastic resin and 1 to 70 wt % of granulated fiber formed by granulating inorganic fibers having an average fiber diameter of 0.1 to 1.0 μm, an aspect ratio of 50 to 300, and an oil absorption of 400 ml/100 g and above, said granulated fiber having an average diameter of 0.5 to 5 mm and a bulk density of 0.15 to 0.4.

7 Claims, 3 Drawing Sheets

THERMOPLASTIC RESIN COMPOSITION AND PROCESS FOR PRODUCING THE SAME

BACKGROUND OF THE INVENTION

1. Field of the Invention

The present invention relates to a thermoplastic resin composition and a process for producing the same. More particularly, it is concerned with a thermoplastic resin composition which has a good appearance and superior physical properties and also with a process for producing said thermoplastic resin composition in such a manner as to keep its quality stable 2. Description of the Related Art Among composite resin materials whose matrix resin is a thermoplastic resin, fiber-reinforced thermoplastic resins are particularly important in many application areas because of their lightweight properties and superior mechanical strength.

In the case where the reinforcement is dispersed glass fibers or similar long fibers, the resulting fiber-reinforced thermoplastic resin has a drawback of being poor in external appearance and dimensional stability due to warpage and deformation, although it has at least improved mechanical strength. On the other hand, the one reinforced with short fibers such as wollastonite and milled fiber with a small aspect ratio is not satisfactory in the improvement of stiffness. For this reason, there has recently been proposed a process for producing a composite material having a high stiffness and good external appearance by the incorporation of extremely fine fibers with a high aspect ratio. (See Japanese Patent Laid-open No. 109846/1982.)

Unfortunately, the extremely fine fibers with a high aspect ratio have such a low bulk density of 0.02 to 0.1 that their stable production is difficult to achieve. Moreover the fibers do not disperse well into the matrix on account of their strong tendency toward agglomeration, which gives rise to the gelling on the surface of the molded article. Agglomeration can be eliminated only by mixing with a high shear force, which breaks fibers into short fibers.

On the other hand, there is disclosed a method for incorporating brittle inorganic fibers into a thermoplastic plastic resin without breaking. (See Japanese Patent Laid-open No. 17253/1984.) According to this method, mixing is accomplished by using an extruder having independent feed openings for individual raw materials. The first feed opening is located far from the extruding end, and the second one is located close to the extruding end. To perform mixing, a thermoplastic resin is fed through the first feed opening and then heated in the extruder. When the thermoplastic resin reaches the second feed opening, it is in a molten state. To this molten resin is added fibrous magnesium oxysulfate through the second feed opening. Thus the molten resin and the fibrous magnesium oxysulfate are mixed in the extruder.

This method, however, has the following disadvantages. The fibrous magnesium oxysulfate is so fine and has such a high aspect ratio that it easily gets entangled. The entangled fibers do not get loose completely but clog the extruder screen pack, disabling extrusion. Unevenly dispersed fibers cause the molded articles to look poor and adversely affect the performance of the molded articles. In addition, the fibrous magnesium oxysulfate is so bulky (with a bulk density lower than 0.1) that it cannot be fed into the extruder smoothly. Therefore, only a small amount of the fiber can be incorporated into the molten resin.

The present invention was completed to overcome the above-mentioned disadvantages involved in the prior art. Accordingly, it is an object of the present invention to provide a thermoplastic resin composition which can be formed into molded articles having a good external appearance and superior physical properties. It is another object of the present invention to provide a process for producing said thermoplastic resin composition in a stable manner.

SUMMARY OF THE INVENTION

To achieve the above-mentioned object, the present inventors carried out a series of researches, which led to the finding that a thermoplastic resin composition gives molded articles having a good appearance and superior physical properties if it is composed of a thermoplastic resin and granulated fiber in a specific ratio, said granulated fiber being made of fibers with a specific average fiber diameter, aspect ratio, and oil absorption and also having a specific average diameter and bulk density. The present invention is based on this finding.

The first aspect of the present invention resides in a thermoplastic resin composition which comprises 30 to 99 wt% of a thermoplastic resin and 1 to 70 wt% of granulated fiber formed by granulating inorganic fibers having an average fiber diameter of 0.1 to 1.0 $\mu$m, an aspect ratio of 50 to 300, and an oil absorption of 400 ml/100 g and above, said granulated fiber having an average diameter of 0.5 to 5 mm and a bulk density of 0.15 to 0.4.

The second aspect of the present invention resides in a process for producing a thermoplastic resin composition which comprises mixing in a mixer 30 to 99 wt% of a thermoplastic resin and 1 to 70 wt% of granulated fiber formed by granulating inorganic fibers having an average fiber diameter of 0.1 to 1.0 $\mu$m, an aspect ratio of 50 to 300, and an oil absorption of 400 ml/100 g and above, said granulated fiber having an average diameter of 0.5 to 5 mm and a bulk density of 0.15 to 0.4.

DESCRIPTION OF THE PREFERRED EMBODIMENTS

THERMOPLASTIC RESIN

Figure 1A:
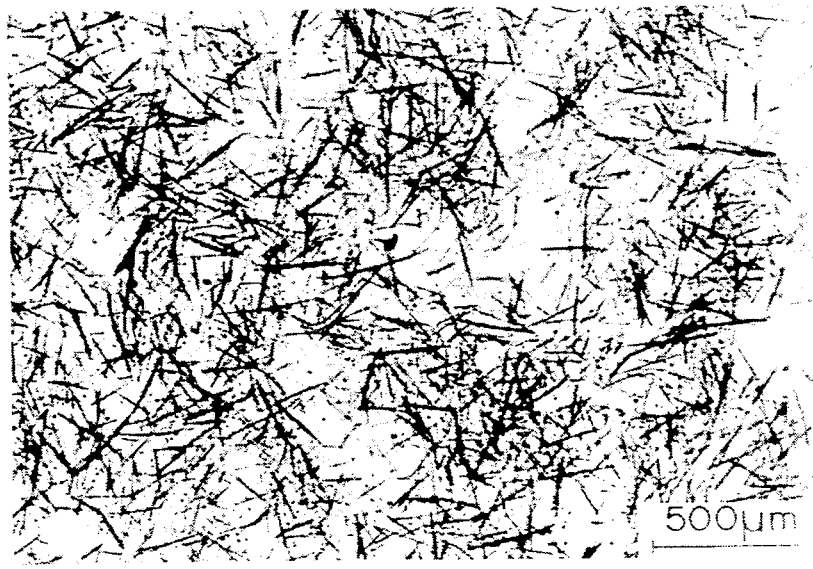
FIGS. 1 (*a*), 1 (*b*), and 1 (*c*) are electron micrographs showing the steps of producing the granulated fiber according to the present invention.

The thermoplastic resin that can be used in the present invention is not specifically limited so long as it has the properties of becoming fluid and plasticized upon heating and becoming solid upon cooling. It includes, for example, polyolefins, polyvinyl chloride, polystyrene, acrylic resin, ABS resin, nylon, polycarbonate, and thermoplastic polyester. These thermoplastic resins may be homopolymers, copolymers, or mixtures of two or more thermoplastic resins. Polyolefins are preferable among the above-mentioned thermoplastic resins.

Examples of the polyolefins include polyethylene (such as high-density polyethylene, medium-density polyethylene, low-density polyethylene, and linear low-density polyethylene), polypropylene, and polybutene.

They may be used individually or in combination with one another.

Preferable among these polyolefins are polypropylene, especially one having a melt index lower than 50 g/10 min, and polyethylene, especially one having a melt index lower than 30 g/10 min.

Examples of the polypropylene include polypropylene homopolymer, ethylene-propylene block copolymer, ethylenepropylene random copolymer, ethylene-propylene copolymer (such as ethylene-propylene-diene copolymer which contains a third monomer such as dicyclopentadiene), and mixtures of polypropylene homopolymer and ethylene-propylene copolymer.

Additional examples of the polyolefins include those which are produced in two, three, or more stages of polymerization by the use of a Ziegler-Natta catalyst According to the multiple stage polymerization process, polypropylene is produced in the following manner.

In the first stage, propylene monomer is polymerized in the presence of a Ziegler-Natta catalyst to give polypropylene homopolymer. In the second stage, newly fed propylene is polymerized in the presence of newly added ethylene and the polypropylene homopolymer obtained in the first stage, with the remaining ProPYlene monomer removed or not removed. In each stage, the reaction pressure is in the range of several atm to 40 atm and the reaction temperature is in the range of room temperature to 80° C. The polymerization may be performed by solution polymerization, slurry polymerization, gas-phase polymerization, or combination thereof.

Since the polypropylene obtained by the abovementioned multistage polymerization contains ethylene as the monomer unit, it might contain polyethylene or ethylene-propylene copolymer, although not confirmed yet.

According to the present invention, it is desirable to use the polypropylene obtained by the above-mentioned multistage polymerization, especially one which contains less than 7 wt % of ethylene.

What is important in the present invention is that the composition should contain the above-mentioned thermoplastic resin in an amount of 30 to 99 wt %, preferably 40 to 95 wt %. With less than 30 wt %, the composition is extremely poor in impact resistance; and with more than 99 wt %, the composition is extremely poor in stiffness.

INORGANIC FIBER

The inorganic fibers that can be used in the present invention include, for example, fibrous magnesium oxysulfate, potassium titanate fiber, magnesium hydroxide fiber, magnesium oxide fiber, gypsum fiber, glass fiber, silicon carbide fiber, calcium silicate fiber, and carbon fiber. Preferable among them are magnesium-based fibers such as fibrous magnesium oxysulfate, magnesium hydroxide fiber, and magnesium oxide fiber.

What is important in the present invention is that the above-mentioned inorganic fiber should have an average fiber diameter of 0.1 to 1.0 $\mu$m, preferably 0.2 to 0.8 $\mu$m. With an average fiber diameter smaller than 0.1 $\mu$m, the fibers are liable to form agglomerates which cannot be opened easily without the breaking of fibers.

The inorganic fiber should have an aspect ratio of 50 to 300, preferably 60 to 200. With an aspect ratio smaller than 50, the fiber does not impart sufficient stiffness to the composition; and with an aspect ratio larger than 300, the fiber causes the composition to look poor.

The inorganic fiber should have an oil absorption of 400 ml/100 g and above, preferably 450 ml/100 g and above. With an oil absorption less than 400 ml/100 g, the inorganic fibers cannot be opened completely once they have agglomerated, and agglomerates lead to gel in the molded articles.

According to the present invention, the inorganic fibers which have a specific average fiber diameter, aspect ratio, and oil absorption as mentioned above should be used in the form of granulated fiber having a specific average diameter and bulk density.

The granulation of the inorganic fibers should preferably be accomplished in the following manner. At first, the inorganic fibers are placed in a vessel containing a prescribed amount of water and the inorganic fibers are opened and dispersed into water by stirring. After separation of water, the gel-like fibers are forced out of a hole, 0.3 to 5 mm in diameter, into granules. The granules are finally dried in an oven to give the desired granulated fibers.

The thus obtained granulated fiber should have an average diameter of 0.3 to 5 mm, preferably 0.5 to 3 mm. With an average diameter smaller than 0.3 mm or larger than 5 mm, the granulated fiber is difficult to handle at the time of mixing.

The granulated fiber should have a bulk density of 0.15 to 0.4, preferably 0.18 to 0.35. With a bulk density lower than 0.15 or higher than 0.4, the granulated fiber cannot be readily fed into the mixer and it makes it difficult to produce a thermoplastic resin composition of stable quality.

The granulated fiber should be incorporated into the thermoplastic resin composition in an amount of 70 to 1 wt %, preferably 50 to 5 wt %. With more than 70 wt %, the resulting thermoplastic resin composition is extremely poor in impact resistance; and with less than 1 wt %, the resulting thermoplastic resin composition is extremely poor in stiffness.

INORGANIC FILLER

The thermoplastic resin composition of the present invention may be incorporated with platy, spherical, or irregularly shaped inorganic fillers in such an amount not harmful to the object of the present invention.

The preferred platy inorganic fillers are those which have an average particle diameter of 0.3 to 10 $\mu$m. They include, for example, talc, mica, clay, sericite, glass flake, graphite, and aluminum flake having the above-mentioned average particle diameter. Particularly preferable are talc, sericite, and clay having the average particle diameter in the range of 0.5 to 2 $\mu$m.

The preferred spherical or irregularly shaped inorganic fillers are those which have an average particle diameter of 0.05 to 10 $\mu$m. They include, for example, calcium carbonate (ground, precipitated, and colloidal), barium sulfate, magnesium carbonate, alumina, silica, calcium sulfate, glass beads, glass powder, hollow glass spheres, quartz sand, ground silica rock, carbon black, magnesium hydroxide, zinc oxide, lead white, basic magnesium carbonate, zeolite, molybdenum sulfide, titanium oxide, diatomaceous earth, calcium hydroxide, calcium sulfite, ground quarts, bentonite, and sodium sulfate which have the above-mentioned average particle diameter.

OTHER ADDITIVES

The thermoplastic resin composition of the present invention may be incorporated, according to need, with other polymers and additives in such an amount not harmful to the object of the present invention. These polymers include elastomers (such as EP rubber and SB rubber), maleic anhydride-modified polyolefins, and epoxy-modified polyolefin. These additives include surface treating agents (such as silane-based coupling agents and titanate-based coupling agents), dispersing agent (such as higher fatty acids, metal salts of higher fatty acids, and higher alcohols), antioxidants, UV light absorbers, antistatic agents, weathering agents, and flame retardants.

Preferred examples of the elastomers include styrene-based elastomers such as styrene-ethylene-butadienestyrene rubber (S-E-B-S), styrene-butadiene-styrene rubber (S-B-S), styrene-isoprene-styrene rubber (S-I-S), and styrene-butadiene rubber (S-S), and olefin-based elastomers such as ethylene-propylene rubber and ethylene-propylene-diene rubber. Particularly preferable among them are styrene-butadiene rubber and ethylene-propylene rubber.

The thermoplastic resin composition of the present invention may be incorporated, according to need, with a variety of additives such as slip agents, nucleating agents, antioxidants, antistatic agents, UV light absorbers, flame retardants, mold releases, and coloring agents, in addition to the above-mentioned components. The slip agent is especially effective in dispersing the granulated fiber added to the thermoplastic resin composition, thereby improving the impact strength and flow properties.

Examples of the slip agents include hydrocarbons (such as liquid paraffin, natural paraffin, and wax), higher fatty acids or oxyfatty acids (such as stearic acid, palmitic acid, oleic acid, myristic acid, and behenic acid), fatty acid esters [such as lower alkyl (e.g, methyl, ethyl, propyl, and butyl) esters of higher fatty acids (e.g., stearic acid, palmitic acid, oleic acid, myristic acid, and behenic acid)], alcohols (such as aliphatic higher and lower alcohols and polyglycols), metal soaps (such as calcium stearate and barium stearate), and silicones (such as silicone oil and modified silicones). Preferable among them are metal soaps (which are metal salts of higher fatty acids) and alkyl esters of higher fatty acids. Particularly preferable are magnesium stearate and n-butyl stearate.

Examples of the antioxidants include phenols (such as 2,6-di-t-butyl-p-cresol, butylated hydroxyanisole, 2,6-dibutyl -4-ethylphenol, stearyl-$\beta$-(3,5-di-t-butyl-4-hydroxyphenyl)propionate, 2,2-methylenebis(4-methyl-6-t-butylphenol), 2,2-methylenebis(4-ethyl-6-t-butyl-phenol), 4,4-thiobis(3-methyl-6-t-butylphenol), 4,4-butylidenebis(3-methyl-6-t-butyphenol), tetrabis[methylene-3-(3,5-di-t-butyl-4-hydroxyphenyl]propionate]methane, and 1,1,3-tris-(2-methyl-4-hydroxy-5-t-butyl-phenyl)butane); amines (such as phenyl-$\beta$-naphthylamine and N,N-diphenyl-p-phenylenediamine); phosphorus compounds (such as tris(nonylphenyl) phosphite, triphenyl phosphite, trioctadecyl phosphite, and diphenylisodecyl phosphite; and sulfur compounds such as dilauryl thiodipropionate, dimyristyl thiodipropionate, and distearyl thiodipropionate).

Examples of the antistatic agents include nonionic antistatic agents (such as polyoxyethylene alkylamine and polyoxyethylene alkylamide), anionic antistatic agents (such as alkyl sulfonate and alkylbenzenesulfonate), cationic antistatic agents (such as quaternary ammonium chloride and quaternary ammonium sulfate), and amphoteric antistatic agents (such as alkylbetaine and alkylimidzoline).

Examples of the UV light absorbers include salicylates (such as phenyl salicylate, and p-t-butylphenyl salicylate), benzophenones (such as 2,4-dihydroxybenzophenone and 2-hydroxy-4-methoxybenzophenone), and benzotriazole (such as 2-(2-hydroxy-5-methylphenyl)benzotriazole and 2-(2-hydroxy-5-t-butylphenyl)benzotriazole).

Examples of the nucleating agents include metal salts of organic acids, amine salts of organic acids, and sorbitol derivatives Preferable among them are metal salts of organic acids and sorbitol derivatives Examples of the metal salts of organic acids include sodium salt, calcium salt, aluminum salt, and magnesium salts of benzoic acid, p-(t-butyl)benzoic acid, cyclohexanecarboxylic acid, $\beta$-naphthoic acid, cyclopentanecarboxylic acid, succinic acid, diphenylacetic acid, glutaric acid, isonicotinic acid, adipic acid, sebacic acid, phthalic acid, isophthalic acid, benzenesulfonic acid, glucolic acid, caproic acid, isocaproic acid, phenylacetic acid, and cinnamic acid. Preferable among them is aluminum p-(t-butyl)benzoate.

Examples of the amine salts of organic acids include amines derived from benzoic acid, phthalic acid, and adipic acid.

Examples of the sorbitol derivatives include 1,3,2,4-di-benzylidenesorbitol, 1,3,2,4-di(methoxybenzylidene)-sorbitol, and 1,3,2,4-di(ethoxybenzylidene)sorbitol. The first is preferable among them.

Production of thermoplastic resin composition

The thermoplastic resin composition of the present invention may be prepared by preblending the necessary components according to the formulation using a ribbon blender or V-blender to such an extent that the granulated fiber does not open and then mixing the components. However, it should preferably be prepared according to the process of the present invention.

What is important in the process of the present invention is that the thermoplastic resin specified above and the granulated fiber specified above should be mixed while the thermoplastic resin is still in the molten state.

In order that the thermoplastic resin and the granulate fiber are mixed while the thermoplastic resin is in the molten state, the two components should be fed into a mixing machine such as extruder provided with a first feed opening which is located far from the extruding end and a second feed opening which is located close to the extruding end. The thermoplastic resin should be fed through the first feed opening. While being moved forward in the extruder, the thermoplastic resin is heated, and it is melted when it passes under the second feed opening. The granulated fiber is added to this molten thermoplastic resin through the second feed opening, so that the two components are mixed in the extruder.

For adequate mixing, the thermoplastic resin and granulated fiber should be fed into the mixing machine (e.g., extruder) such that the amount of the thermoplastic resin is 30 to 99 wt %, preferably 40 to 95 wt %, of the total amount of the thermoplastic resin and granulated fiber. With less than 30 wt % of the thermoplastic resin, the resulting thermoplastic resin composition is extremely poor in impact resistance; and with more than 99 wt % of the thermoplastic resin, the resulting thermoplastic resin composition is extremely poor in stiffness.

The mixing machine that can be used for the process of the present invention is not specifically limited so long as it can mix the thermoplastic resin in molten state and the granulated fiber. Examples of the mixing machines include screw extruders (such as single-screw extruders and multi-screw extruders) and non-screw extruders (such as elastic extruders, hydrodynamic extruders, ram-type continuous extruders, roll-type extruders, and gear-type extruders). Preferable among them are screw extruders, particularly twin-screw extruders.

According to the process of the present invention, mixing is carried out at a temperature higher than the melting point (or softening point) of the thermoplastic resin. The mixing temperature is usually 180° C. and above, preferably 210° C. and above.

In the case of mixing by a screw extruder, the screw speed should be usually 100 to 600 rpm, preferably 200 to 300 rpm.

Thus, according to the process of the present invention, it is possible to obtain the thermoplastic resin composition composed of a thermoplastic resin and inorganic fibers uniformly dispersed therein, without breaking the inorganic fibers fed in the form of specific granulated fiber. In addition, the process of the present invention provides the thermoplastic resin composition in a stable manner at all times.

Thermoplastic resin composition and molding thereof

The thermoplastic resin composition obtained according to the process of the present invention can be formed into a variety of molded articles by varied molding methods such as injection molding, extrusion molding, blow molding, compression molding, lamination, rolling, stretching, and stamping.

The molded articles of the thermoplastic resin composition obtained according to the present invention have a good external appearance free of gelling and also have superior mechanical properties.

The thermoplastic resin composition obtained according to the process of the present invention will find use in the automotive and electrical industries and other broad application areas.

ADVANTAGES OF THE PRESENT INVENTION

According to the process of the present invention, it is possible to produce the thermoplastic resin composition of uniform quality in a stable manner. The thermoplastic resin composition can be made into molded articles which have a good external appearance free of gelling and also have superior mechanical properties such as flexural strength, flexural modulus, and Izod impact strength.

EXAMPLES

The invention will be described in more detail with reference to the examples that follow. In the examples, the granulated fiber was prepared in the following manners.

Preparation of granulated fiber A

In a 20-liter stirring vessel were placed 10 liters of water and 1 kg of fibrous magnesium oxysulfate (raw material) having an average fiber diameter of 0.6 $\mu$m, an aspect ratio of 100, an oil absorption of 320 ml, and a bulk density of 0.06. The fibers were stirred for 3 hours to open agglomerates. The fibers were separated from water. The fibers in the form of gel were forced out of an orifice, 3 mm in diameter. The extrudate was dried and cut into granules. The granulated fiber was dried at 200° C. in an oven for 1 hour. Thus there was obtained the desired granulated fiber A. Table 1 shows the properties of the fibrous magnesium oxysulfate after separation from water and before granulation, and also shows the properties of the granulated fiber.

Preparation of granulated fiber B

The same procedure as in the preparation of granulated fiber A was repeated except that the fibrous magnesium oxysulfate (raw material) was replaced by the one having an average fiber diameter of 0.4 $\mu$m, an aspect ratio of 50, an oil absorption of 340 ml, and a bulk density of 0.08 (as shown in Table 1), and the stirring time was changed from 3 hours to 10 minutes. Thus there was obtained the desired granulated fiber B. Table 1 shows the properties of the fibrous magnesium oxysulfate after separation from water and before granulation, and also shows the properties of the granulated fiber.

Preparation of granulated fiber C

The procedure used in the preparation of granulated fiber A was repeated with some modification. The fibrous magnesium oxysulfate was replaced by the one having an average fiber diameter of 0.4 $\mu$m, an aspect ratio of 40, an oil absorption of 320 ml, and a bulk density of 0.09 (as shown in Table 1). The opening of agglomerates by water was not performed, but the fibers were made into a gel form by adding 2 liters of water. The fibers in gel form were forced out for granulation, followed by drying at 200° C. in an oven for 1 hour. Thus there was obtained the desired granulated fiber C.

Table 1 shows the properties of the granulated fibers A, B, and C.

TABLE 1

|  | Properties of fibrous magnesium oxysulfate before granulation | | | | Properties of granulated fiber | |
| --- | --- | --- | --- | --- | --- | --- |
|  | Average fiber dia. | Aspect ratio | Oil absorption | Bulk density | Average diameter | Bulk density |
| Granulated Fiber A | 0.6 $\mu$m | 100 | 510 ml/100 g | 0.05 | 3 mm | 0.21 |
| Granulated Fiber B | 0.4 $\mu$m | 50 | 380 ml/100 g | 0.07 | 3 mm | 0.30 |
| Granulated Fiber C | 0.4 $\mu$m | 40 | 320 ml/100 g | 0.09 | 3 mm | 0.40 |

Incidentally, in the examples the oil absorption was measured for fibers before granulation according to JIS K5101, and the bulk density was measured for granulated fiber after complete drying according to JIS K5101.

Figure 1B:
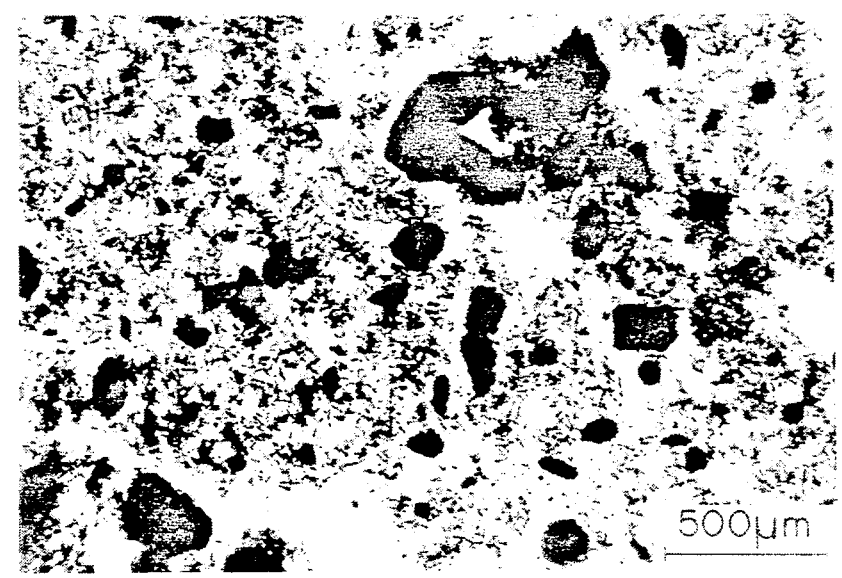
Figure 1C:
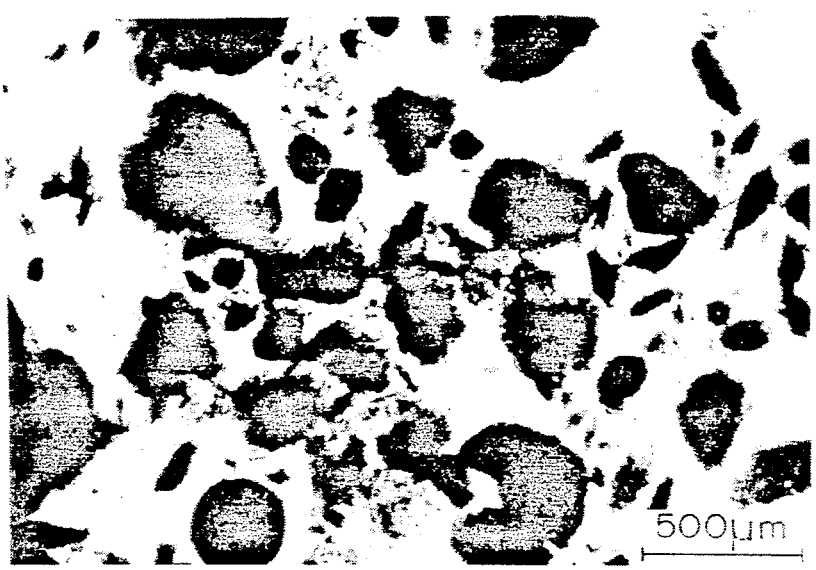

FIGS. 1(a), 1(b), and 1(c) are electron micrographs taken in the steps of producing granulated fibers A, B, and C.

FIG. 1(a) is an electron micrograph agglomerates were opened after stirring for 3 hours in the production of granulated fiber A.

FIG. 1(b) is an electron micrograph taken when agglomerates were opened after stirring for 10 minutes in the production of granulated fiber B.

FIG. 1(c) is an electron micrograph of fibrous magnesium oxysulfate as the raw material.

EXAMPLE 1

80 wt % of polypropylene (a) (containing 4 wt % of ethylene and having an MI of 8 g/10 min) and 20 wt % of granulated fiber A were mixed, and the mixture was pelletized using a twin-screw mixer (2FCM made by Kobe Steel Ltd.) at a set temperature of 200° C. and a rotor speed of 900 rpm. The pellets were made into a flat plate (140×140×3 mm) and a test piece using an injection molding machine. The surface of the flat plate was visually checked for gel. The test piece was used for the measurement of flexural strength (according to JIS K7203), flexural modulus (JIS K7203), and Izod impact strength (JIS K7110). The results are shown in Table 2.

COMPARATIVE EXAMPLES 1 AND 2

The same procedure as in Example 1 was repeated except that granulated fiber A was replaced by granulated fiber B and granulated fiber C, respectively. The results are shown in Table 2.

TABLE 2

|  | Surface state | Flexural strength (kg/cm²) | Flexural modulus (kg/cm²) | Izod impact strength, with notch (kg·cm/cm) |
| --- | --- | --- | --- | --- |
| Example 1 | Good | 510 | 47,300 | 6.7 |
| Comparative Example 1 | Some gel | 470 | 36,000 | 4.2 |
| Comparative Example 2 | Some gel | 440 | 32,400 | 3.6 |

EXAMPLES 2 AND 3 AND COMPARATIVE EXAMPLES 3 AND 4

Polypropylene (a) and granulated fiber A or fibrous magnesium oxysulfate (raw material, with agglomerates not opened) were mixed in the ratio shown in Table 3. The mixture was pelletized using a twin-screw mixer (ZSK-90, made by Werner) at a set temperature of 200° C. and a screw speed of 300 rpm. The delivery from the mixer was observed and measured. The results are shown in Table 3.

TABLE 3

|  | Polypropylene (wt %) | Granulated fiber (wt %) | Raw material (wt %) *1 | Mixing state; delivery (kg/h) |
| --- | --- | --- | --- | --- |
| Example 2 | 70 | 30 | — | Stable, 600 |
| Example 3 | 50 | 50 | — | Stable, 500 |
| Comparative Example 3 | 70 | — | 30 | Unstable, 200 *2 |
| Comparative Example 4 | 50 | — | 50 | Unoperable *3 |

*1 Fibrous magnesium oxysulfate, with agglomerates not opened.
*2 Poor bite and frequent strand breaking.
*3 Poor bite.

EXAMPLES 4 TO 6 AND COMPARATIVE EXAMPLE 5 AND 6

Granulated fibers D, E, F, G, and H as shown in Table 4 were prepared in the same manner as in the production of granulated fiber A, except that the hole diameter was changed from 3 mm to 1 mm, 2 mm, 3 mm, 0.1 mm, and 8 mm, respectively. The same procedure as in Example 1 was repeated except that the granulated fiber A was replaced by granulated fiber D, E, F, G, or H, using a twin-screw mixer (4FCM, made by Kobe Steel Ltd.) at a set temperature of 200° C. and a rotor speed of 600 rpm, with the orifice opening at 60%. The results are shown in Table 5.

TABLE 4

|  | Average particle diameter | Bulk density |
| --- | --- | --- |
| Granulated fiber D | 1 mm | 0.30 |
| Granulated fiber E | 2 mm | 0.25 |
| Granulated fiber F | 3 mm | 0.21 |
| Granulated fiber G | 0.1 mm | 0.14 |
| Granulated fiber H | 8 mm | 0.11 |

TABLE 5

|  | Polypropylene (a) (wt %) | Granulated fiber (wt %) | Mg stearate *3 (parts by weight) | Mixing and delivery (kg/h) |
| --- | --- | --- | --- | --- |
| Example 4 | 60 | D, 40 | 0.4 | Stable, 420 |
| Example 5 | 60 | E, 40 | 0.4 | Stable, 400 |
| Example 6 | 60 | F, 40 | 0.4 | Stable, 380 |
| Comparative Example 5 | 60 | G, 40 | 0.4 | Unstable, 180 *1 |
| Comparative Example 6 | 60 | H, 40 | 0.4 | Unoperable *2 |

*1 Frequent strand breaking and poor dispersion due to incomplete air vent.
*2 Poor bite.
*3 The amount is for 100 parts by weight of the total amount of polypropylene and granulated fiber.

EXAMPLES 7 TO 9 AND COMPARATIVE EXAMPLES 7 TO 9

Granulated fibers I, J, K, and L were prepared in the same manner as in the production of granulated fiber A, except that the fibrous magnesium oxysulfate (raw material and the fibrous magnesium oxysulfate before granulation were replaced by the one as specified in Table 6 and the fibers were forced out of a hole 3 mm or 1 mm in diameter. Polypropylene (b) (containing 4 wt % of ethylene and having an MI of 10 g/10 min) was mixed with the granulated fiber prepared as mentioned above in the ratio as shown in Table 7. The mixture was pelletized using a twin-screw mixer (2FCM) at a set temperature of 200° C. and a rotor speed of 900 rpm.

The pellets were made into a flat plate (140×140×3 mm) and a test piece using an injection molding machine. The flat plate and test piece were tested for physical properties in the same manner as in Example 1. The results are shown in Table 7.

TABLE 6

|  | Bulk density of raw material with agglomerates not opened | Properties of fibrous magnesium oxysulfate before granulation | | | Properties of granulated fiber | |
|---|---|---|---|---|---|---|
|  |  | Average fiber dia. | Aspect ratio | Oil absorption (ml/100 g) | Average diameter | Bulk density |
| Granulated fiber I | 0.04 | 0.5 μm | 200 | 550 | 3 mm | 0.25 |
| Granulated fiber J | 0.07 | 0.8 μm | 60 | 480 | 1 mm | 0.33 |
| Granulated fiber K | 0.14 | 2 μm | 60 | 240 | 3 mm | 0.38 |
| Granualted fiber L | 0.12 | 0.5 μm | 30 | 290 | 3 mm | 0.31 |

TABLE 7

|  | Polypropylene (b) (wt %) | Granulated fiber, kind, amount (wt %) | Flexural strength (kg/cm$^2$) | Flexural modulus (kg/cm$^2$) | Izod impact strength (kg·cm/cm) |
|---|---|---|---|---|---|
| Example 7 | 90 | I, 10 | 530 | 38,100 | 9.7 |
| Example 8 | 80 | I, 20 | 570 | 49,700 | 6.1 |
| Example 9 | 90 | J, 10 | 510 | 35,400 | 10.2 |
| Comparative Example 7 | 90 | K, 10 | 430 | 26,200 | 6.4 |
| Comparative Example 8 | 80 | K, 20 | 450 | 34,100 | 3.9 |
| Comparative Example 9 | 90 | L, 10 | 410 | 24,100 | 10.5 |

EXAMPLES 10 TO 13

The same procedure as in Example 1 was repeated except that polypropylene (a) was replaced by a polyolefin as shown in Table 8. In Table 8, polyolefin (c) denotes linear low-density polyethylene (having a density of 0.920 g/cm$^3$ and an MI of 1.0 g/10 min and containing 5 mol % of butene-1); polyolefin (d) denotes high-density polyethylene (having a density of 0.968 g/cm$^3$ and an MI of 5 g/10 min); polyolefin (e) denotes polypropylene "Idemitsu Polypro J3050H" made by Idemitsu Petrochemical Co., Ltd. (having a density of 0.90 g/cm$^3$ and an MI of 35 g/10 min); and polyolefin (f) denotes a 20:80 mixture of (d) and (e). The results are shown in Table 8.

TABLE 8

|  | Polyolefin (wt %) | Granulated fiber (wt %) | Surface state | Flexural strength (kg/cm$^2$) | Flexural modulus (kg/cm$^2$) | Izod impact strength, with notch (kg·cm/cm) |
|---|---|---|---|---|---|---|
| Example 10 | c, 80 | 20 | Good | 291 | 20,900 | 12.7 |
| Example 11 | d, 80 | 20 | Good | 383 | 36,200 | 5.5 |
| Example 12 | e, 80 | 20 | Good | 501 | 45,700 | 5.9 |
| Example 13 | f, 80 | 20 | Good | 480 | 41,800 | 8.2 |

COMPARATIVE EXAMPLES 10 TO 13

The same procedure as in Comparative Example 2 was repeated except that polypropylene (a) was replaced by a polyolefin as shown in Table 9. The polyolefins are the same as those used in Examples 10 to 13. The results are shown in Table 9.

TABLE 9

|  | Polyolefin (wt %) | Granulated fiber (wt %) | Surface state | Flexural strength (kg/cm$^2$) | Flexural modulus (kg/cm$^2$) | Izod impact strength, with notch (kg·cm/cm) |
|---|---|---|---|---|---|---|
| Comparative Example 10 | c, 80 | 20 | Much gel | 204 | 14,600 | 8.6 |
| Comparative Example 11 | d, 80 | 20 | Much gel | 321 | 22,300 | 4.2 |
| Comparative Example 12 | e, 80 | 20 | Much gel | 410 | 30,700 | 3.2 |
| Comparative Example 13 | f, 80 | 20 | Much gel | 374 | 28,100 | 5.1 |

EXAMPLE 14

Figure 2:
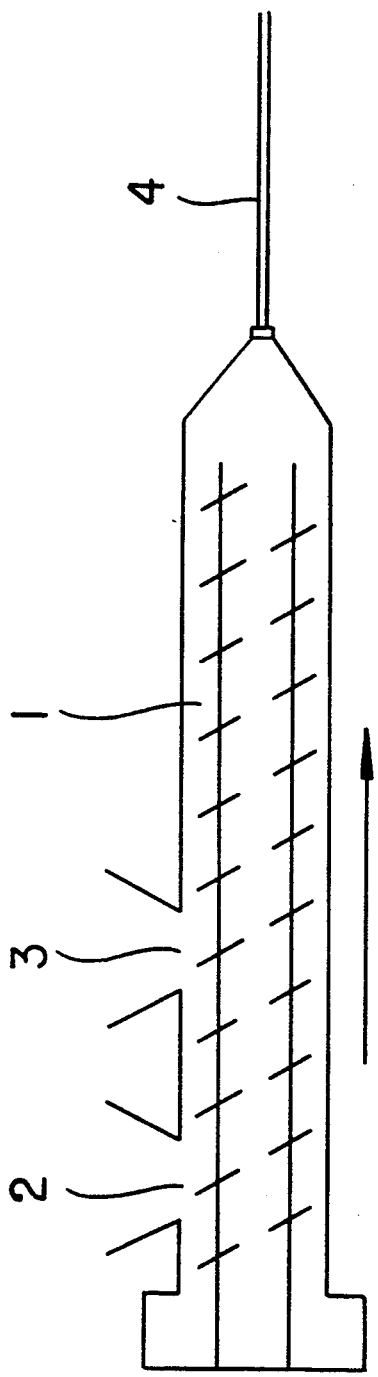
FIG. 2 is a schematic representation of the mixer used in the examples of the present invention.

Mixing was accomplished by using a twin-screw mixing machine (TEM-35, made by Toshiba Machine Co., Ltd.) as shown in FIG. 2. Polypropylene (a) (containing 4 wt % of ethylene and having an MI of 8 g/10 min) was fed into the twin-screw mixing machine I through the feed opening 2 at a feed rate of 24 kg/h. Granulated fiber A was fed through the feed opening 3 at a feed rate of 6 kg/h. Mixing was performed at a set temperature of 200° C. and a rotor speed of 500 rpm. The raw materials fed into the twin-screw mixing machine I are transferred in the direction of arrow shown in FIG. 2. The polypropylene (a) fed through the feed opening 2 becomes melted when it reaches the position of the feed opening 3. The resulting mixture was extruded into a strand 4, which was then cut into pellets.

To evaluate the production stability, the strand 4 being extruded from the twin-screw mixing machine was checked for breakage and the resulting pellets were visually checked for dispersion of fibrous magnesium oxysulfate.

It was found that polypropylene (a) and granulated fiber A were fed through the feed openings 2 and 3 as intended. It was also found that the strand 4 was formed without breakage and the pellets contain uniformly dispersed fibrous magnesium oxysulfate. These are an indication of good production stability.

The thus obtained pellets were formed into a flat plate measuring 140×140×3 mm by injection molding. The flat plate was visually checked for gel on the surface. The flat plate was also checked, using test pieces cut out of it, for flexural strength (according to JIS K72203), flexural modulus (according to JIS K7203), and Izod impact strength (according to JIS K7110). The results are shown in Table 10.

EXAMPLE 15

The same procedure as in Example 14 was repeated except that polypropylene (a) was fed at a feed rate of 24 kg/h and granulated fiber A was fed at a feed rate of 6 kg/h. The results are shown in Table 10.

COMPARATIVE EXAMPLE 14

The same procedure as in Example 14 was repeated except that granulated fiber A was fed through the feed opening 2 which is originally designed for the feeding of polypropylene (a). The results are shown in Table 10.

COMPARATIVE EXAMPLE 15

The same procedure as in Example 14 was repeated except that granulated fiber A was replaced by granulated fiber B. The results are shown in Table 10.

COMPARATIVE EXAMPLE 16

The same procedure as in Example 14 was repeated except that granulated fiber A was replaced by granulated fiber C. The results are shown in Table 10.

COMPARATIVE EXAMPLE 16

The same procedure as in Example 14 was repeated except that granulated fiber A was replaced by ungranulated fiber M (having a bulk density of 0.06) which is a raw material for granulated fiber A. However, it was impossible to carry out mixing on account of the poor bite of ungranulated fiber M which is probably due to the excessively small bulk density. The results are shown in Table 10.

TABLE 10

|  | Resin | | Granulated fiber | | | | | | |
|---|---|---|---|---|---|---|---|---|---|
|  | Kind | Feed rate (kg/h) | Feed opening | Kind | Feed rate (kg/h) | Feed opening | Production stability | Moldings appearance | Flexural strength (kg/cm²) | Flexural modulus (kg/cm²) |
| Example 14 | *1 | 24 | *2 | A | 6 | *3 | good | *4 | 620 | 61,800 |
| Example 15 | *1 | 15 | *2 | A | 15 | *3 | good | *4 | 780 | 122,000 |
| Comparative Example 14 | *1 | 24 | *2 | A | 6 | *2 | good | *4 | 510 | 40,300 |
| Comparative Example 15 | *1 | 24 | *2 | B | 6 | *3 | good | *5 | 560 | 54,000 |
| Comparative Example 16 | *1 | 24 | *2 | C | 6 | *3 | good | *6 | 540 | 51,400 |
| Comparative Example 17 | *1 | 24 | *2 | M | 6 | *3 | unoperable | — | — | — |

*1 Polypropylene (a) (containing 4 wt % of ethylene and MI = 8 g/10 min)
*2 Feed opening 2 shown in FIG. 2.
*3 Feed opening 3 shown in FIG. 2.
*4 The molded article has a good surface appearance free of gel.
*5 The molded article has a poor surface appearance with gel.
*6 The molded article has a poor surface appearance with much gel.

In the following Examples and Comparative Examples, granulated fibers N, O, P, and Q were prepared in the same manner as in the production of granulated fiber A, except that the fibrous magnesium oxysulfate was replaced by the one which had undergone opening and has an average fiber diameter, an aspect ratio, and an oil absorption as shown in Table 11 and that the orifice for forcing out was changed from 3 mm to 1 mm, 0.5 mm, 8 mm, and 1 mm in diameter, respectively. The physical properties of granulated fibers N, O, P, and Q are shown in Table 11.

TABLE 11

|  | Properties of fibrous magnesium oxysulfate before granulation | | | | Properties of granulated fiber | |
|---|---|---|---|---|---|---|
|  | Average fiber dia. | Aspect ratio | Oil absorption | Bulk density | Average diameter | Bulk density |
| Granulated fiber N | 0.6 μm | 100 | 510 ml/100 g | 0.05 | 1 mm | 0.30 |
| Granulated fiber O | 0.4 μm | 120 | 490 ml/100 g | 0.05 | 0.5 mm | 0.19 |
| Granulated fiber P | 0.6 μm | 100 | 510 ml/100 g | 0.05 | 8 mm | 0.11 |
| Granulated | 0.4 μm | 40 | 320 ml/100 g | 0.11 | 1 mm | 0.32 |

TABLE 11-continued

| | Properties of fibrous magnesium oxysulfate before granulation | | | | Properties of granulated fiber | |
|---|---|---|---|---|---|---|
| | Average fiber dia. | Aspect ratio | Oil absorption | Bulk density | Average diameter | Bulk density |
| fiber Q | | | | | | |

EXAMPLE 16

The same procedure as in Example 14 was repeated except that polypropylene (a) was fed at a feed rate of 21 kg/h and granulated fiber A was replaced granulated fiber N, which was fed at a feed rate of 9 kg/h. The results are shown in Table 12.

EXAMPLE 17

The same procedure as in Example 14 was repeated except that polypropylene (a) was fed at a feed rate of 27 kg/h and granulated fiber A was replaced granulated fiber O, which was fed at a feed rate of 3 kg/h. The results are shown in Table 12.

COMPARATIVE EXAMPLE 18

The same procedure as in Example 16 was repeated except that granulated fiber N was fed through the feed opening 2 for polypropylene (a). The results are shown in Table 12.

COMPARATIVE EXAMPLE 19

The same procedure as in Example 16 was repeated except that granulated fiber N was replaced by granulated fiber P. The results are shown in Table 12.

COMPARATIVE EXAMPLE 20

The same procedure as in Example 16 was repeated except that granulated fiber N was replaced by granulated fiber Q. The results are shown in Table 12.

COMPARATIVE EXAMPLE 21

The same procedure as in Example 18 was repeated except that granulated fiber A was fed through the feed opening 2 instead of the feed opening 3. The results are shown in Table 13.

EXAMPLE 19

The same procedure as in Example 18 was repeated except that talc was replaced by calcium carbonate (having an average particle diameter of 0.9 $\mu$m). The results are shown in Table 13.

EXAMPLE 20

The same procedure as in Example 18 was repeated except that talc was replaced by ethylene propylene rubber (EPR). The results are shown in Table 13.

EXAMPLE 21

The same procedure as in Example 14 was repeated except that polypropylene (a) was replaced by high-density polyethylene (HDPE having a density of 0.968 g/cm$^3$ and an MI of 5 g/10 min) and granulated fiber A was replaced by granulated fiber 0. The results are shown in Table 13.

EXAMPLE 22

The same procedure as in Example 14 was repeated except that polypropylene (a) was replaced by linear low-density polyethylene (LLDPE having a density of 0.920 g/cm$^3$ and an MI of 1.0 g/10 min) and granulated fiber A was replaced by granulated fiber O. The results are shown in Table 13.

EXAMPLE 18

The same procedures as in Example 14 was repeated except that polypropylene (a) was fed at a feed rate of 21 kg/h and talc was fed at a feed rate of 6 kg/h through the feed opening 2 and granulated fiber A was fed at a feed rate of 3 kg/h through the feed opening 3. The results are shown in Table 13.

EXAMPLE 23

The same procedure as in Example 14 was repeated except that polypropylene (a) was replaced by ABS resin (ABS resin HUHE1300 made by Kanegafuchi Chemical Industry Co., Ltd.). The results are shown in Table 13.

TABLE 12

| | Resin | | | Granulated fiber | | | | | | |
|---|---|---|---|---|---|---|---|---|---|---|
| | Kind | Feed rate (kg/h) | Feed opening | Kind | Feed rate (kg/h) | Feed opening | Production stability | Moldings appearance | Flexural strength (kg/cm$^2$) | Flexural modulus (kg/cm$^2$) |
| Example 16 | *1 | 21 | *2 | N | 9 | *3 | good | *4 | 680 | 88,100 |
| Example 17 | *1 | 27 | *2 | O | 3 | *3 | good | *4 | 540 | 42,700 |
| Comparative Example 18 | *1 | 21 | *2 | N | 9 | *2 | good | *4 | 550 | 52,400 |
| Comparative Example 19 | *1 | 21 | *2 | P | 9 | *3 | unoperable | — | — | — |
| Comparative Example 20 | *1 | 27 | *2 | Q | 3 | *3 | good | *6 | 480 | 27,700 |

*1 Polypropylene (a) (containing 4 wt % of ethylene and MI = 8 g/10 min)
*2 Feed opening 2 shown in FIG. 2.
*3 Feed opening 3 shown in FIG. 2.
*4 The molded article has a good surface appearance free of gel.
*6 The molded article has a poor surface appearance with much gel.

TABLE 13

| | Feed opening 2 | | Feed opening 3 | | Heat* distortion temperature | Moldings appearance | Flexural strength (kg/cm$^2$) | Flexural modulus (kg/cm$^2$) |
|---|---|---|---|---|---|---|---|---|
| | Material fed | Feed rate (kg/h) | Granulated fiber fed | Feed rate | | | | |
| Example 18 | *1<br>talc | 21<br>6 | A | 3 | 102° C. | *4 | 565 | 58,400 |
| Comparative Example 21 | *1<br>talc<br>G. fiber A | 21<br>6<br>3 | — | — | 95° C. | *4 | 470 | 48,600 |
| Example 19 | *1<br>CaCO$_3$ | 21<br>6 | A | 3 | — | *4 | 510 | 46,900 |
| Example 20 | *1<br>EPR | 21<br>6 | A | 3 | — | *4 | 390 | 28,800 |
| Example 21 | HDPE | 24 | O | 6 | — | *4 | 360 | 38,400 |
| Example 22 | LLDPE | 24 | O | 6 | — | *4 | 275 | 27,100 |
| Example 23 | ABS | 27 | O | 3 | — | *4 | 870 | 51,400 |

*1 Polypropylene (a) (containing 4 wt % of ethylene and MI = 8 g/10 min)
*4 the molded article has a good surface appearance free of gel.
*Heat distortion temperature was measured according to JIS K6871.

What is claimed is:

1. A thermoplastic resin composition comprising 30 to 99 wt % of a thermoplastic resin and 1 to 70 wt % of granulated magnesium oxysulfate fibers dispersed therein, said granulated fibers having a bulk density of 0.15 to 0.4, and having been prepared by stirring agglomerates of magnesium oxysulfate fibers, said fibers having an average fiber diameter of 0.1 to 1 μm, an aspect ratio of 50 to 300 and an oil absorption of 400 ml/100 g, with water to open the agglomerates and disperse the fibers in the water; separating the fibers from the water; extruding the fibers in the form of a gel through a hole 0.3 to 5 mm in diameter; cutting the extrudate into granules; and drying the granules.

2. A composition according to claim 1, wherein the thermoplastic resin is a polyolefin.

3. A composition according to claim 2, wherein the polyolefin is polyethylene or polypropylene.

4. A composition according to claim 3, wherein the polyethylene is linear low-density polyethylene or high-density polyethylene.

5. A composition according to claim 3, wherein the polyethylene has a melt index lower than 30 g/10 min.

6. A composition according to claim 3, wherein the polyolefin is polypropylene.

7. A composition according to claim 6, wherein the polypropylene has a melt index lower than 50 g/10 min.

* * * * *